United States Patent [19]
Clow et al.

[11] Patent Number: 6,005,890
[45] Date of Patent: Dec. 21, 1999

[54] AUTOMATICALLY ADJUSTING COMMUNICATION SYSTEM

[75] Inventors: Robert J. Clow, Aurora; Lee D. Tice, Bartlett, both of Ill.

[73] Assignee: Pittway Corporation, Chicago, Ill.

[21] Appl. No.: 08/916,465

[22] Filed: Aug. 7, 1997

[51] Int. Cl.[6] .................................................. G01R 31/08
[52] U.S. Cl. .......................... 375/221; 375/225; 375/257; 370/249; 370/252
[58] Field of Search ...................................... 375/219, 221, 375/225, 257; 370/249, 252; 714/25, 48; 327/170, 172, 178; 340/531, 657

[56] References Cited

U.S. PATENT DOCUMENTS

| | | | |
|---|---|---|---|
| 4,553,042 | 11/1985 | Batterman | 307/263 |
| 5,450,438 | 9/1995 | Landry et al. | 375/222 |
| 5,524,122 | 6/1996 | Lepitre et al. | 375/222 |
| 5,802,446 | 9/1998 | Giorgi et al. | 455/69 |
| 5,828,695 | 10/1998 | Webb | 375/219 |
| 5,898,321 | 4/1999 | Ilkbahar et al. | 326/87 |

*Primary Examiner*—Amanda T. Le
*Attorney, Agent, or Firm*—Rockey, Milnamow & Katz, Ltd.

[57] ABSTRACT

A dynamically adjustable communication system and method automatically adjust transmission rates of discontinuous waveforms from one signal level to another for the purpose of optimizing a quality parameter of a transmitted signal. Circuitry coupled to the transmission medium provides feedback to transmitter circuitry for the purpose of adjusting at least one of a rise time and a fall time parameter of a transmitted signal for the purpose of enhancing transmission quality. Transmission rate can also be automatically adjusted to maximize data rate and minimize errors.

42 Claims, 6 Drawing Sheets

AUTOMATICALLY ADJUSTING COMMUNICATION SYSTEM

FIELD OF THE INVENTION

The invention pertains to communications systems. More particularly, the invention pertains to such systems wherein transmission characteristics are automatically varied in response to transmission medium characteristics.

BACKGROUND OF THE INVENTION

It has long been recognized that when transmitting signals to a remote receiver that characteristics of the relevant transmission medium can affect the quality of the received signals. Cable or wire transmission lines share a number of characteristics. These include signal distortion caused by external noise sources, varying electrical characteristics of the medium due to inconsistent quality and impedance miss-matches due to connections to the medium.

It has also been shown that many communication problems are not related to the baud rate but rather to the slew rate of the transmitted signals. A high rate of transition in the waveform voltage from one level to another (or high slew rate) may contribute to a high communication rate. However, this mode of operation will electrically couple into other adjacent wiring and create "crosstalk", cause excessive signal oscillations (ringing), or otherwise distort the waveform. A low slew rate will slow down the communication rate, minimizing these problems, but result in a longer time to complete messages.

One known approach requires the use of high quality, expensive, coaxial cable. Such cable provides substantially constant impedances, irrespective of length when properly terminated. However, coaxial cable is not a viable solution in many systems. It is expensive and because it is shielded can be inconvenient for field installers and maintenance personnel. While possibly usable in many new systems it is not a cost-effective replacement for existing media.

There is a continuing need for improved transmission systems which address at least some of the above enumerated problems. Such improvements are especially important given the continuing trend to distributed, multi-processor systems.

Preferably such systems will provide increased degrees of communication reliability with a variety of transmission media. In addition, it would be desirable if such improvements could be achieved without a need for extensive and expensive upgrades to existing transmission systems.

Thus, there is a continuing need for distortion minimizing systems which can automatically respond to different transmission media and to exterior noise sources.

SUMMARY OF THE INVENTION

In accordance with the invention, communication systems and methods are provided which automatically adjust transmission parameters, other than bit or baud rate, so as to improve system performance. In one aspect, the transition rate, such as rise time or fall time, is adjusted in response to detection of the characteristics of transmitted signals to, as a result, improve those characteristics.

By adjusting a transmission signal parameter, the present system and method result in achieving optimal transmission speed with minimal crosstalk and minimal distortion. In yet another aspect of the invention, the time interval assigned to transmitting a selected bit of information, such as a 1 or a 0, can be established as a ratio of another parameter, for example, slew rate, such that the slew rate is altered so as to maximize transmission quality characteristics, the bit interval will also be altered.

In yet another aspect, the system and method will respond dynamically to transient noise which will potentially degrade performance. In such an instance, a selected parameter value, such as rise time or fall time or both can be altered, perhaps increased, in response to the presence of a transient noise. The consequence of so altering one or more transmission parameters will reduce communication rate while at the same time increasing reliability. Subsequent to the disappearance of the noise condition, the selected parameter or parameters can again be decreased thereby producing an increased communication rate.

In yet another aspect, one or more processors, coupled to the communications medium, can provide further signal processing as a result of receiving the transmitted signals. Processing can include filtering or smoothing which can be dynamically adjusted in response to detected parameters of the received waveform. For example, in the event that parameters such as rise time or fall time or both are increased or decreased, the smoothing of the waveform at the receiver circuitry can be similarly altered. Smoothing is inversely altered relative to rate.

Systems of the type that automatically vary the characteristics of transmitted signals address many known sources of distortion and automatically compensate for them. For example:

Crosstalk or the Capacitive Coupling of Signals Into Other Wires

If a system that embodies the invention does not exhibit capacitive coupling of signals to other wires and will tolerate a high transmission rate, it can automatically make that determination and adjust the slew rate of the waveform to allow for high speed communications. On the other hand, if there is significant capacitive coupling of signals to other wires causing transmission problems, then the system can automatically adjust the waveform to a slower slew rate so that the electrical coupling between the wiring is reduced to the point that problems no longer occur.

T-taps or Branching of the Wiring

When a wire pair connects to two or more wire pairs, a T-tap or branch connection is formed. This causes a transmission line characteristic impedance mismatch. An electrical wave traveling down the wire will encounter a sudden change of impedance at the point of a T-tap. This mismatch in impedance will cause a reflection and distortion of the waveform. The amount of distortion is related to the slew rate of the waveform.

In cases where a T-tap occurs and causes distortion of the waveform which is sufficient to affect communications, a system that embodies the invention can automatically change the slew rate of the waveform to reduce the distortion such that it no longer affects the communications.

Characteristic Impedance of the Line

Transmission lines can vary significantly dependent upon the type of wire pair. The capacitance, inductance, and resistance characteristics will all affect the waveform and distortion. By automatically changing the slew rate of the waveform, a system that embodies the invention can adapt to any wiring type without communication errors. Automatic compensation of the system does not require the installer of the system to predetermine the operating parameters for the system. This makes the installation simpler to setup and less error prone.

Distortion of the Waveform Due to Outside EMI Sources

If an electrical magnetic interference (EMI) couples into the system and causes communication errors, a system that embodies the invention can automatically adjust the slew rate and smoothing of the waveform to eliminate the interference problem. If this interference problem was temporary, the system will readjust after the interference goes away to again increase the slew rate to obtain a faster communication rate.

In yet another aspect of the invention, where an existing transmission medium is to be used, the present system and method make is possible to dynamically alter transmission parameters so as to achieve optimal transmission given the characteristics of the medium. Hence, existing transmission systems can be upgraded, using the same medium.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 1:
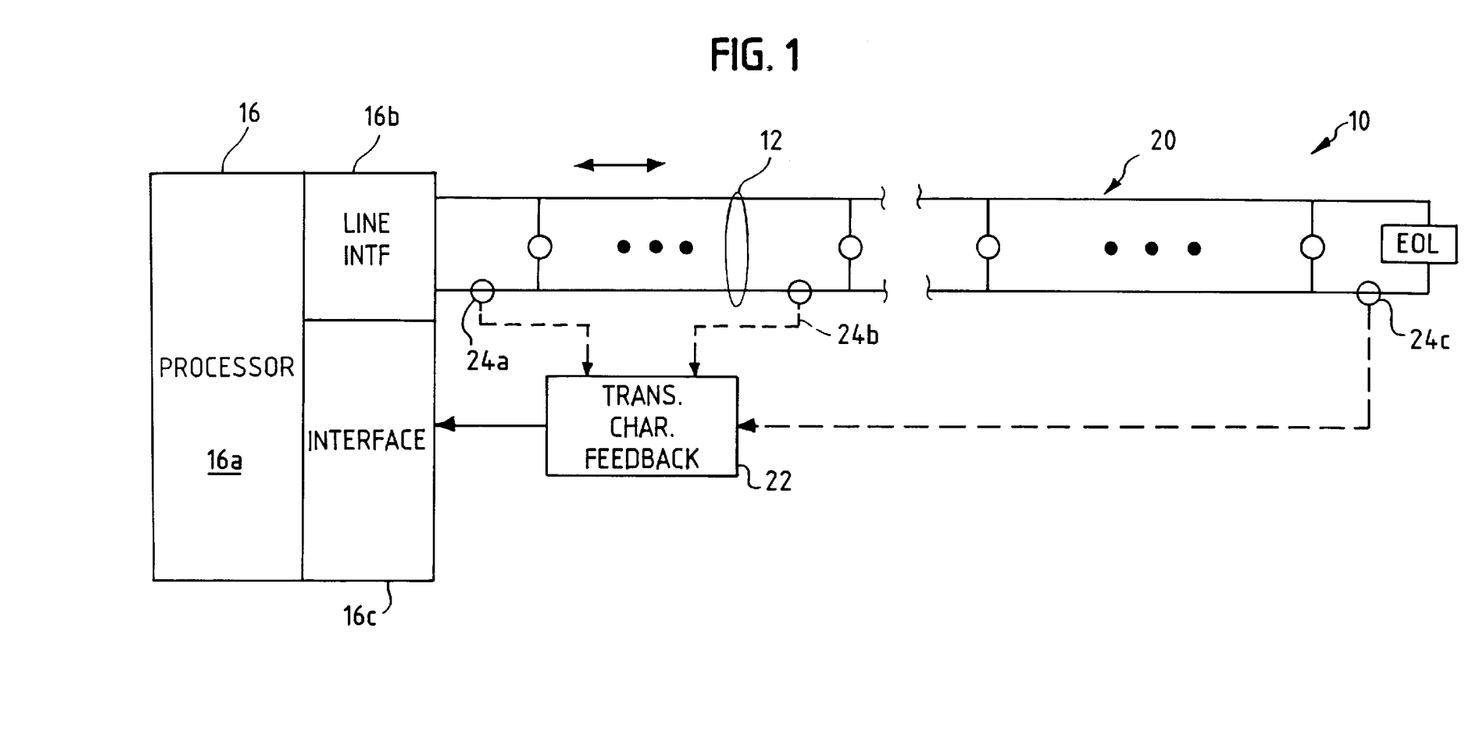
FIG. 1 is a block diagram of an exemplary transmission system which embodies the invention.

FIG. 1 illustrates a transmission system 10. The transmission system 10 incorporates a bidirectional communication link 12 which could be implemented as wire cable including coaxial cable, twisted pair ribbon cable or parallel extending wire conductors without departing from the spirit and scope of the present invention. It will be understood that the type of transmission medium is not a limitation of the present invention. In addition, while the link 12 is illustrated as a single linear link, it will be understood that the invention contemplates usage with transmission systems that include additional segments or branches which are attached to the basic link without limitation.

The system 10 includes a control element 16. The control element 16 includes a programmable processor 16a, transmission/receive interface circuitry 16b and other interface circuitry 16c as required. The processor 16a as will be understood by those of skill in the art incorporates or has associated therewith, read/write memory of various types including semiconductor memory as well as magnetic mass memory and read-only memory.

Also coupled to the link 12 is a plurality of spaced apart processors 20. The members of the plurality 20 can each include either hard wired or programmable control elements which are adapted for receiving transmissions from the element 16 or transmitting to the element 16, via the link 12.

While the plurality of processors 20 is illustrated coupled and parallel to the link 12, it will be understood that other transmission geometries could be used without departing from the spirit and scope of the present invention. For example, each of the members of the plurality 20 could be allocated a separate distinct communication link coupled to the element 16. Alternately, the link could be configured in the form of a plurality of spaced apart nodes, wherein each of the members of the plurality 20 would represent one of the nodes, with different links extending between different pairs of nodes.

The exemplary system 10 could, for example, be configured as supervisory systems of the general types described in Tice et al. U.S. Pat. No. 4,916,432 entitled Smoke and Fire Detection Communication or Bystrak et al. U.S. Pat. No. 5,539,389 entitled Device Group Communication for Fire, Security and Control Systems. The noted patents are assigned to the assignee hereof and incorporated by reference.

Reverting again to FIG. 1, the system 10 also includes circuitry for sensing characteristics of transmitted signals. The circuitry 22 is coupled between the link 12, such as illustrated in phantom at one or more coupling points 24a, 24b or 24c without limitation.

The circuitry 22 feeds back parameter characteristics of transmitted signals to the interface 16c which in turn makes that information available to the processor 16a. The processor 16a, upon receipt of feedback information is then able to adjust one or more parameters of the transmitted signals on the link 12 to thereby improve one or more selected parameters of received signals.

Figure 2:
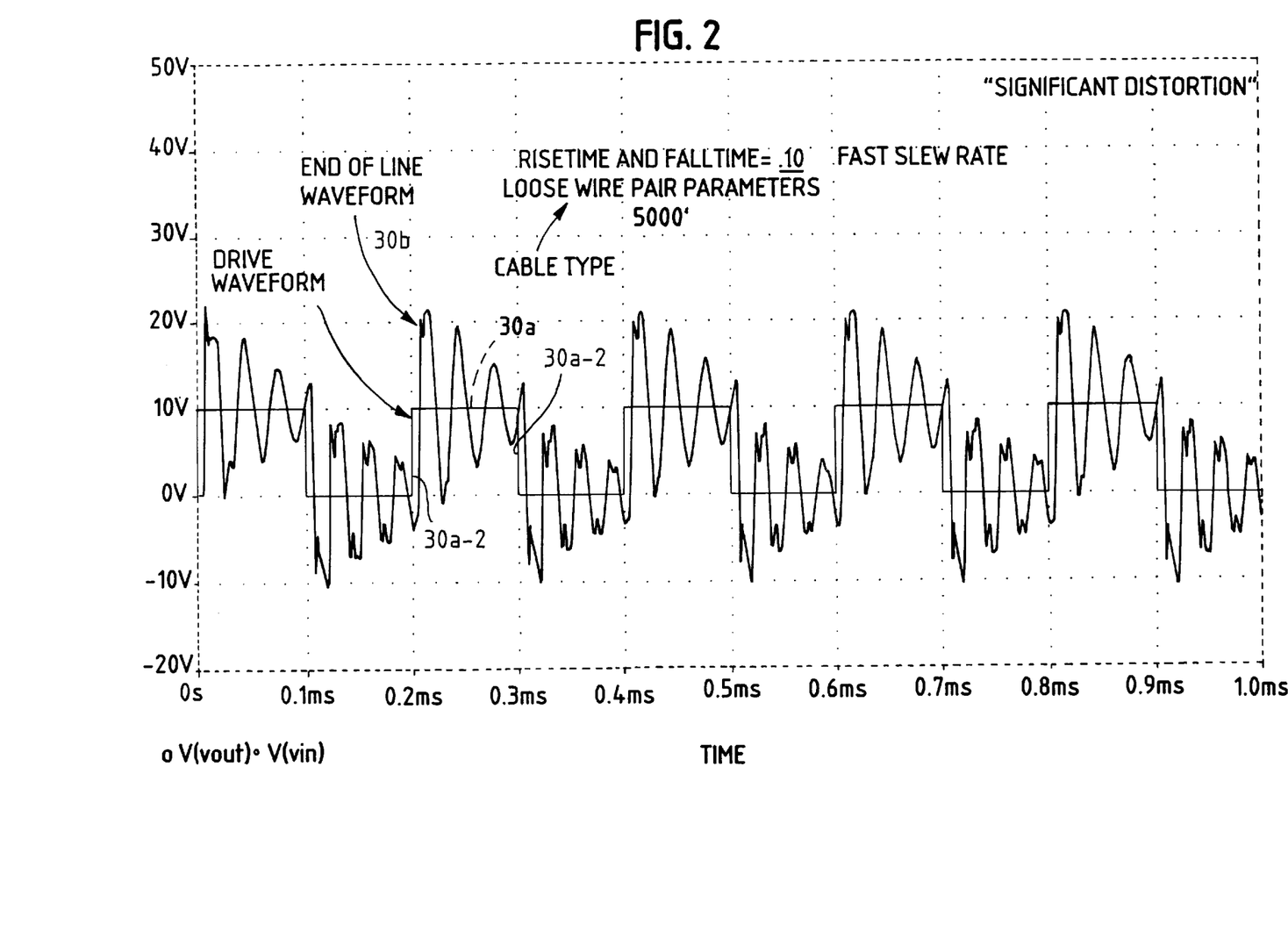
FIG. 2 is a graph illustrating signal distortion.

FIG. 2 illustrates a discontinuous, driving waveform 30a with selected rise and fall times 30a-1, 30a-2 transmitted via the link 12 from the control element 16. FIG. 2 also illustrates an end of line waveform 30b detected at end of line feedback connection 24c by the circuitry 22. The end of line signal 30b exhibits a large number of over shoots and under shoots and is characteristic of the results of attempting to transmit signals via a transmission medium which is not capable, for whatever reason, of transmitting that signal without introducing distortion.

Figure 3:
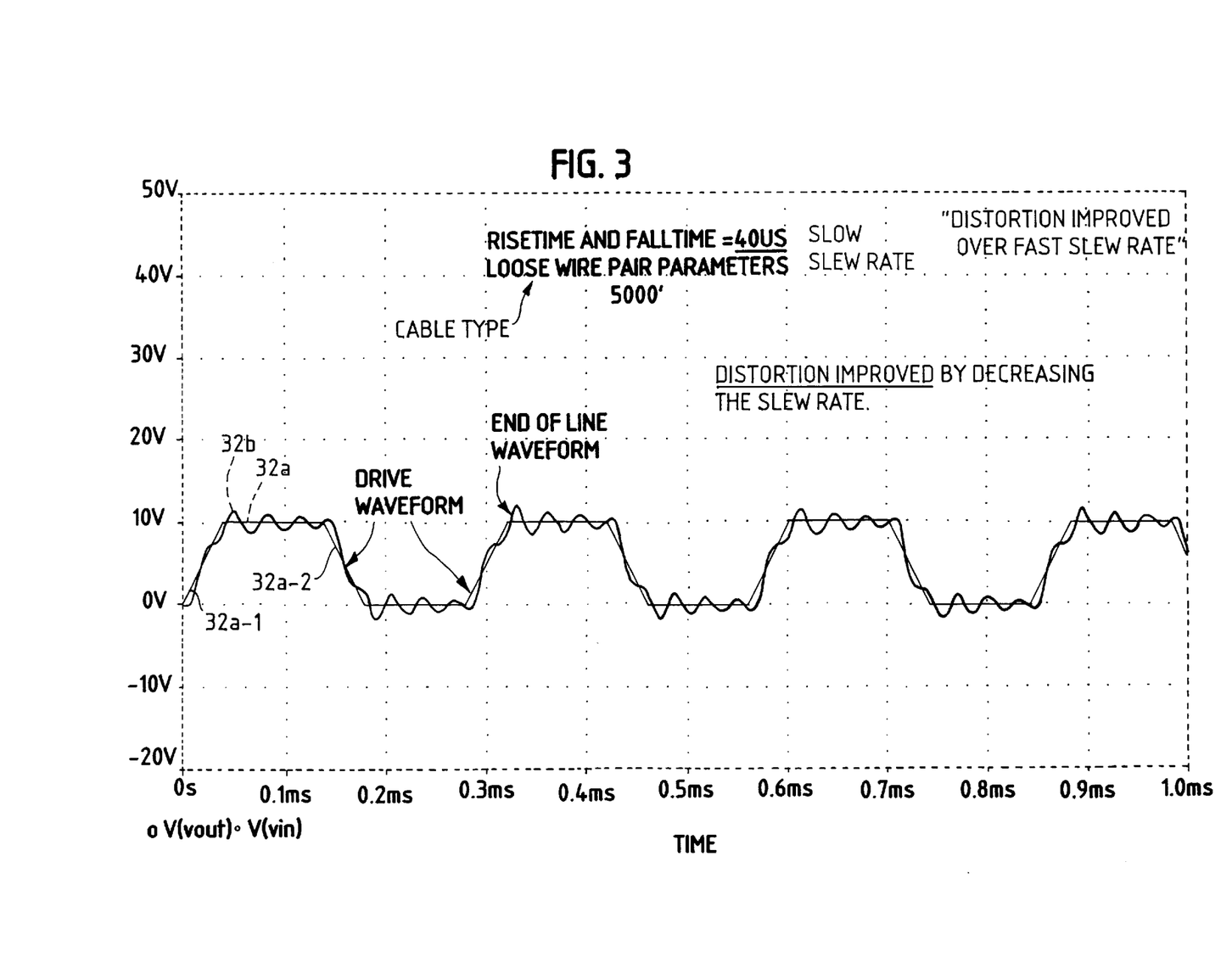
FIG. 3 is a graph illustrating compensation to minimize reflections and distortion.

FIG. 3 illustrates the results of the present apparatus and method wherein a discontinuous, driving signal 32a has reduced rise and fall times 32a-1 and 32a-2. The driving waveform of FIG. 3 has been automatically adjusted by the element 16 in response to feedback from the circuitry 22.

FIG. 3 also illustrates an end of line output waveform output 32b which exhibits significantly reduced distortion, relative to the waveform 30b (FIG. 2) in response to reduced rise times and fall times, or slew rate. It will be understood that other parameters other than slew rate might be adjustable alone, or in combination with a slew rate, without departing from the spirit and scope of the present invention.

Figure 4:
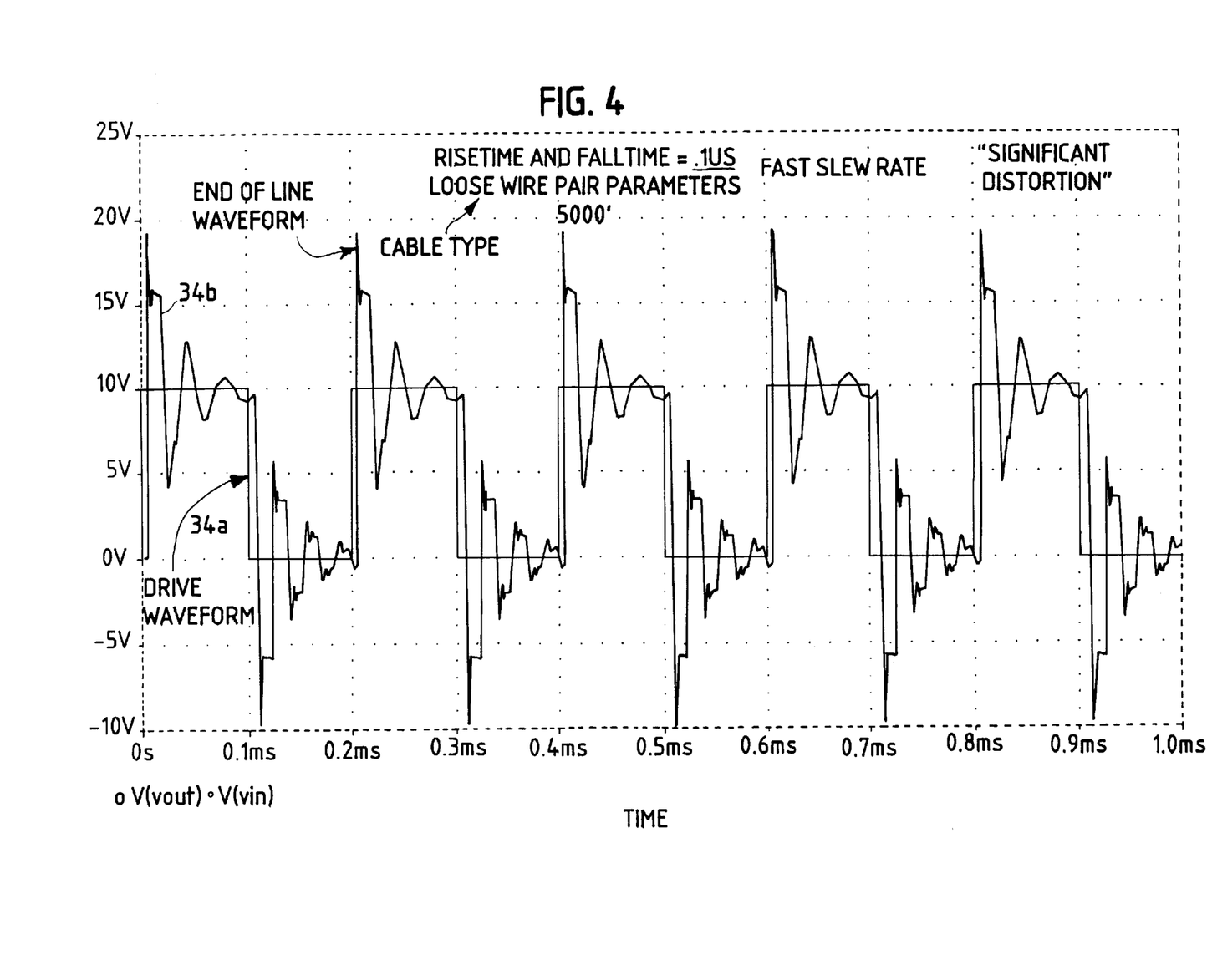
FIGS. 4–6 are a set of graphs which taken together illustrate various degrees of compensation.
Figure 5:
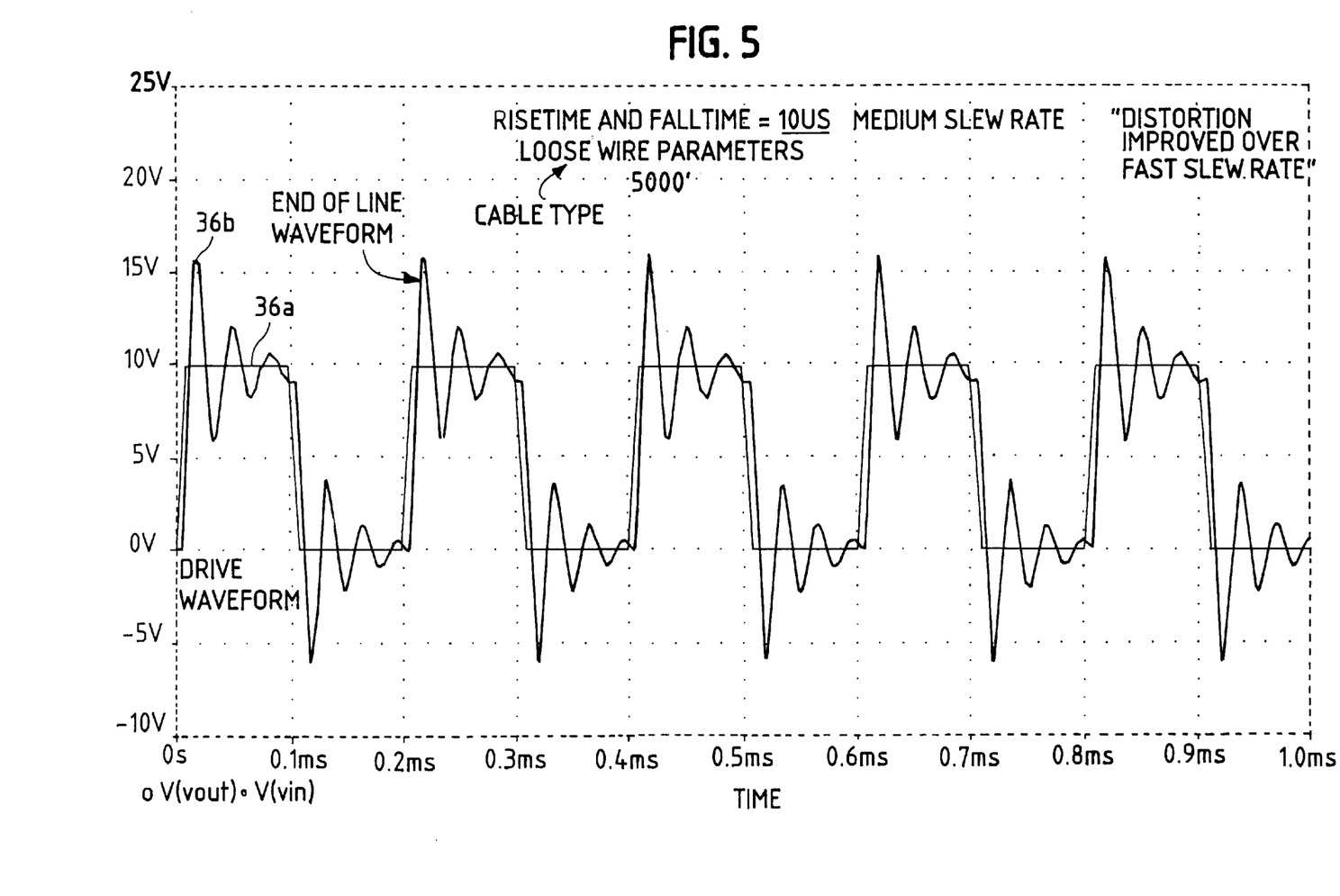
Figure 6:
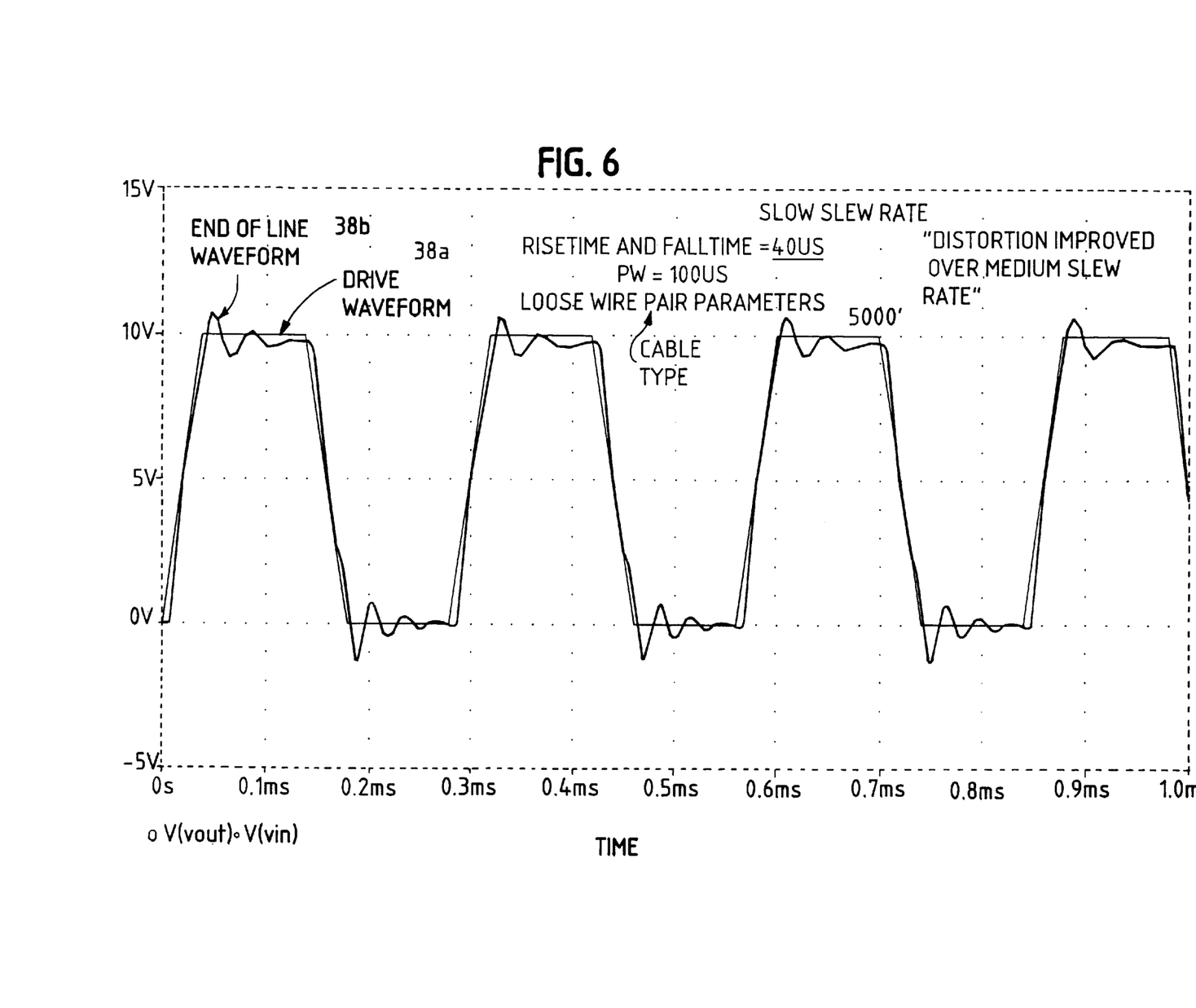

FIGS. 4 through 6 illustrate the results of modifying a parameter, such as slew rate or rise and fall time of a waveform, such as waveforms 34a, 36a and 38a transmitted from a source such as transmitters 16b on a medium along with respective end of line or received signals 34b, 36b and 38b. As illustrated in FIGS. 4 through 6, decreasing the slew rate or rise and fall times of the driving waveform reduces received or end of line waveform distortion significantly.

Hence, by adjusting the rise and fall times, as illustrated in FIGS. 4 through 6 the control element 16 can automatically optimize transmission quality on the link 12 at a given transmission rate. It will also be understood that displaced members of the plurality 20 could in turn incorporate monitoring circuitry for the signals received on the link 12 for purposes of adjusting parameters of their transmissions either to other members of the plurality 20 or to the element 16.

One method of automatically adjusting the waveform is to start out with the slowest (longest) slew rate at a selected transmission rate to initially set up the devices coupled to the system. After the devices have been initialized and stabilized, the control unit 16 can start to increase the slew rate, and/or the transmission rate. The system will monitor performance and stop increasing the slew rate when the performance degrades. The control element can then reduce the slew rate a predetermined amount to arrive at a system operating rate. Similar steps can be taken with respect to transmission rate.

Periodically, the control element can re-evaluate the slew rate and/or transmission rate to see if one or the other can be further increased. If noise is introduced to the system (which will degrade performance), the control element can automatically start decreasing the slew rate, slowing down the communication, until the noise condition disappears. After the noise condition has disappeared, the system can again increase the slew rate and speed up. Transmission rate can also be adjusted to respond to external noise.

The above discussion has been directed toward transmission signals which exhibit binary or two state characteristics. It will be understood that these illustrations are exemplary and not limiting. The present system and method are usable with continuous signals piece-wise continuous, or multi-level signals including, for example, triangular waveforms.

It will also be understood that transmission rate can first be adjusted to a maximum, optimal value based on feedback received from the received signals. Subsequently, the rise time, fall time or both can be adjusted to maximize signal quality.

It will also be understood that both transmissions rate and slew rate can be periodically adjusted to take into account dynamically changing line characteristics. Finally, the two rates can be adjusted simultaneously if desired.

Filtering of signals at receiving processors can dynamically be adjusted to take into account the varying characteristics of received signals. As slew rate increases, the degree of filtering can be automatically reduced to shorten response time at the receiving processor. As the slew rate decreases, the degree of filtering can safely be increased.

In a transmission system intended for use in supervising a region information can initially be transmitted between devices using binary coded signals. In this embodiment, voltage or current modulation could be used without limitation. In another embodiment, pulse width modulation could be used. For example, in a binary system, a first value can be transmitted at a width such as one millisec with a second value transmitted with a three millisec width.

If no errors are detected by the system control element, the width of the first value can be reduced by 50%. The width of the second is also reduced while keeping the 1:3 ratio (alternately, a 1:2 ratio could be used). The 50% reduction in width an be repeated until a pre-set minimum, for example in a range of 30–50 microsections is reached provided no errors are detected.

Where the transmitting element begins to detect errors, the slew rate can be reduced to try to improve transmission quality. For example, the slew rate can be decreased from a maximum to a minimum value in steps while monitoring the quality of the transmission. If the error rate goes to zero or is acceptably low, then the communications process can be conducted at the respective pulse widths and rise times. If the error rate continues to be unacceptably high, then the pulse widths can be increased and another adjustment of slew rate undertaken.

As an alternate, a pulse width for each respective data bit can be set and not changed. In this embodiment, only slew rate is adjusted. In either type of embodiment, the transmission quality can be continuously or intermittently monitored for feedback and control purposes.

In a particular embodiment the system 10 can be configured as a supervisory system. For example, at least some of the processors 20 could each be coupled to a sensor. Representative sensors include switch contacts, infrared, motion or ambient condition sensors. Ambient condition sensors can include smoke, temperature, flame or gas sensors without limitation. For example, the system 10 could be configured as a fire alarm system. At least some of the processors 20 could be programmable smoke detectors. The control element 16 could include control programs for the purpose of carrying out fire profile analysis.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A method of transmitting electrical signals using a transmission medium comprising:

coupling electrical signals to the medium wherein at least some of the signals have at least one of a measurable rise time parameter and a measurable fall time parameter;

detecting a transmission quality indicating parameter at a feedback location on the medium and in response thereto altering at least one of the rise time and fall time parameters in a predetermined fashion.

2. A method as in claim 1 wherein the altering step includes altering both parameters.

3. A method as in claim 1 which includes providing a transmission line as the medium.

4. A method as in claim 1 which includes coupling discontinuous signals to the medium.

5. A method as in claim 1 wherein the quality parameter is indicative of distortion, at least at a selected region of the medium, and wherein the altering step modifies at least one parameter so as to minimize distortion at the selected region.

6. A method as in claim 5 which includes altering both rise time and fall time parameters so as to minimize distortion.

7. A method as in claim 6 which includes coupling multi-valued, discontinuous signals to the medium.

8. A method as in claim 7 which includes providing at least one conductive member as the medium and wherein the electrical signals are coupled to the conductive member at a selected location.

9. A method as in claim 8 wherein the selected location is displaced from the feedback location.

10. A method as in claim 1 which includes establishing a transmission rate.

11. A method as in claim 10 which includes altering the rate in accordance with transmission quality.

12. A method as in claim 11 which includes increasing the transmission rate, in accordance with at least one of the parameter values and in accordance with a quality criterion to a maximum value.

13. A method as in claim 12 which includes reducing the transmission rate a predetermined amount from the maximum value.

14. A method as in claim 13 wherein transmission rate is related to at least one of the parameter values.

15. A method as in claim 1 wherein the transmission quality is detected simultaneously with the coupling step.

16. A method of transmitting time varying input electrical signals along a transmission link comprising:

coupling the input electrical signals to the link wherein at least some of the signals exhibit substantially identical rise and fall times having a first value;

detecting a value of a transmission parameter of the signals coupled to the link and in response thereto altering at least one of the rise and fall times thereby altering the parameter value in a predetermined fashion.

17. A method as in claim 16 wherein the detected parameter is indicative of the quality of the transmission at a particular point in time and wherein the rise and fall times are adjusted together so as to maximize the quality of the transmission.

18. A method as in claim 17 wherein quality of transmission is optimized by adjusting the rise and fall times such that a waveform of a signal from the transmission line corresponds as closely as possible to a waveform of the input signal to the transmission line.

19. A method as in claim 16 wherein the input signals are coupled to the line during an interval of time wherein the parameter is detected and wherein at least one of the rise and fall times is adjusted during the internal.

20. A method as in claim 16 wherein in the coupling step the input electrical signals are in the form of step-wise, discontinuous, serial pulse trains.

21. A method as in claim 20 wherein the pulse trains exhibit at least two different values.

22. A method as in claim 16 which includes, before the detecting step, establishing a data transmission rate for one of the signals to be transmitted in addition to the rise and fall times.

23. A method as in claim 22 which includes, before the detecting step, increasing the transmission rate while monitoring a data error parameter.

24. A method as in claim 23 wherein in response to the monitored error parameter the transmission rate is decreased a predetermined amount.

25. A method as in claim 24 wherein the step of altering is dependent on the transmission rate.

26. A dynamically adjustable transmission system comprising:

an adjustable source of electrical signals;

a transmission link coupled to the source wherein the discontinuous signals can be conveyed to displaced locations on the link;

a plurality of spaced apart electrical modules coupled to the link;

circuitry for detecting at least one parameter of a transmitted signal, and control circuitry coupled between the source and the detecting circuitry for providing adjusting signals to the source for altering at least one of a rise time parameter and a fall time parameter of a transmitted signal.

27. A system as in claim 26 which includes circuitry at the source for adjusting a transmission rate of a transmitted signal.

28. A system as in claim 26 which includes additional circuitry at the source for automatically adjusting a transmission rate of a transmitted signal in response to a detected transmitted signal quality parameter.

29. A system as in claim 28 which includes circuitry, coupled to the link, for monitoring the signal quality parameter and providing an indicator thereof to the adjusting circuitry.

30. A system in claim 28 which includes control circuitry for automatically adjusting both the transmission rate and at least the one rise and fall time parameters in accordance with at least the signal quality parameter.

31. A system as in claim 28 which includes sequencing circuitry for first increasing the transmission rate to a maximum value in response to the signal quality parameter and then decreasing the rate a predetermined amount to an operating rate.

32. A system as in claim 31 wherein the sequencing circuitry, for signals transmitted at the operating rate, enables the control circuitry so as to provide the adjusting signals to the source.

33. A system as in claim 26 wherein at least some of the modules include smoothing circuitry.

34. A system as in claim 33 wherein at least some of the smoothing circuitry is adjustable.

35. A system as in claim 34 wherein at least some of the smoothing circuitry is automatically adjustable in response to the magnitude value of at least one of the time parameters.

36. A system as in claim 28 wherein the transmission rate is related to at least one of the time parameters.

37. An alarm system which comprising:

a transmission line;

a plurality of programmed processors coupled to the line wherein at least some of the processors include ambient condition sensors;

adjustable transmission circuitry coupled to the line wherein the circuitry responds to a transmission quality parameter by adjusting a slew rate parameter.

38. A system as in claim 37 which includes feedback circuitry coupled between the line and the transmission circuitry.

39. A system as in claim 38 wherein the transmission circuitry includes circuitry for transmitting at least bi-valued signals.

40. A system as in claim 39 wherein the signal transmits a first value at a first width and a second value at a second width.

41. A system as in claim 40 wherein the first and second widths are related.

42. A system as in claim 41 wherein the second width falls in a range of 1.5 to 3.5 that of the first width.

* * * * *